United States Patent [19]

Pettingell et al.

[11] Patent Number: 5,566,021

[45] Date of Patent: Oct. 15, 1996

[54] MICROSCOPE STAGE HAVING A SLIDING GREASE INTERFACE

[76] Inventors: James T. Pettingell, 620 S. Hayden Dr., Escondido, Calif. 92027; James T. Snyder, 14217 Sandhill Rd., Poway, Calif. 92064

[21] Appl. No.: 409,695

[22] Filed: Mar. 23, 1995

[51] Int. Cl.$^6$ ............................................. G02B 21/26
[52] U.S. Cl. ...................... 359/391; 359/393; 359/396
[58] Field of Search ............................... 359/391, 392, 359/393, 394, 395, 396, 397

[56] References Cited

U.S. PATENT DOCUMENTS

| | | | |
|---|---|---|---|
| 3,572,888 | 8/1971 | Kawashima | 350/86 |
| 3,680,947 | 4/1972 | Wanesky | 350/81 |
| 4,262,991 | 4/1981 | Wagener et al. | 359/393 |
| 4,688,908 | 8/1987 | Moore | 350/531 |
| 4,702,565 | 10/1987 | Schilling et al. | 350/531 |
| 4,711,537 | 12/1987 | Schindl et al. | 350/531 |
| 4,772,109 | 6/1988 | Cutburth et al. | 350/531 |
| 4,812,029 | 3/1989 | Onanhian | 359/391 |
| 4,836,667 | 6/1989 | Ozeki | 359/393 |
| 5,029,791 | 1/1991 | Ceccon et al. | 248/287 |
| 5,270,855 | 12/1993 | Hasegawa | 359/392 |
| 5,280,384 | 1/1994 | Shibasaki | 359/396 |
| 5,357,366 | 9/1994 | Marchlenski | 359/393 |
| 5,364,790 | 11/1994 | Atwood et al. | 359/398 |
| 5,367,401 | 11/1994 | Saulietis | 359/393 |
| 5,419,279 | 5/1995 | Carrico, Jr. et al. | 359/391 |

Primary Examiner—Timothy P. Callahan
Assistant Examiner—My-Trang Nu Ton
Attorney, Agent, or Firm—Page Lohr Associates

[57] ABSTRACT

A microscope stage which provides for displacements in simultaneous rotation and linear translation or combinations thereof while also providing for optical coupling of an illumination light source to an object being addressed. The stage can generally be a plurality of optically transparent plates in proximity to one another having a grease interface therebetween. The grease allows movement of the plates with respect to each other in any direction parallel to their surfaces. The grease and plates are arranged to allow light to be transmitted therethrough. An object can be illuminated through the stage from a source located with the stage between the object and the source.

8 Claims, 8 Drawing Sheets

MICROSCOPE STAGE HAVING A SLIDING GREASE INTERFACE

BACKGROUND OF THE INVENTION

This instant invention is generally concerned with microscope stages and specifically concerned with microscope stages which provide complex movements characterized by simultaneous displacements in a plurality of directions and simultaneous rotations about a plurality of axes.

Microscope stages may typically have many moving parts, parts which are complicated in shape and form, which may be subject to breakage, wear, corrosion, which may be expensive, and which may unnecessarily limit the movement of the stage. Examples may be found in FIG. 2 of U.S. Pat. No. 3,572,888 by inventor KAWASHIMA; FIG. 7 of U.S. Pat. No. 3,680,947 by inventor WANESKY; FIGS. 3 and 4 of U.S. Pat. No. 4,688,908 by inventor MOORE; FIG. 1 of U.S. Pat. No. 4,702,565 by inventor SCHILLING, et al.; and FIG. 2 of U.S. Pat. No. 4,711,537 by inventor SCHINDL, et al.

In addition to the complex arrangement of parts to form a microscope stage, there is a requirement that the stage accommodate optical coupling of an illumination source and an object to be examined. Generally this is accomplished by merely providing an aperture in the center of a stage. Examples of this can be found in FIG. 2 of U.S. Pat. No. 4,772,109 by inventors CUTBURTH, ET AL., and in FIG. 2 of U.S. Pat. No. 5,029,791 by inventors CECCON, ET AL.

Each of the stages mentioned above provide translations along two independent orthoganal directions. Any point in an observation field is addressable by successive linear translations along those two directions. However, it is not easy to smoothly follow a complex path of a curve or path having a wave nature. It is difficult to follow motion which is not along either of the two directions of movement.

A further problem encountered with stages as described above is the impossibility for rotation. If a subject appears in the field in an orientation which is not preferred, then a user may wish to rotate the field about some axis. As the stages described are not generally suited for rotation, an object slide may require manipulation before insertion into a stage. If changes occur during examination, it is impossible to rotate the stage to accommodate a preferred object orientation.

While the systems and inventions of the prior art are designed to achieve particular goals and objectives, some of those being no less than remarkable, these inventions have limitations which prevent their use in new ways now possible. These prior art inventions are not used and cannot be used to realize the advantages and objectives of the present invention.

SUMMARY OF THE INVENTION

Comes now, James T. Snyder and James T. Pettingell with an invention of a sliding interface microscope stage system including devices which provide complex movements characterized by simultaneous displacements in a plurality of directions and simultaneous rotations about a plurality of axes.

A microstage has now been invented which eliminates complicated mechanical parts, which is highly flexible in motion characteristics, which allows an illumination source coupled to an object being examined, and which is simple in operation.

Movement between the flat surfaces of two stage elements is facilitated by an optical grease. The elements, being transparent or arranged to allow the passage of light therethrough, provide a surface to accommodate an object specimen. The surface is moveable with respect to the microscope base. The movement is particularly flexible in that it is possible to simultaneously move along a plurality of directions and about a plurality of axes.

Since the device is comprised of simple, rigid, durable members, it is not subject to damage as in devices known in the art. The device is easy and inexpensive to manufacture.

Various configurations may be employed to allow the stage to accommodate the passage of an illumination beam therethrough. Elements can be made from transparent materials or configured with apertures therein. The stage is intended to be placed in the microscope optical path between the light source and the lens.

It is an object of the invention to provide a microscope stage.

It is a further object to provide a highly dynamic translation device for microscopes.

It is an object to provide a surface for receiving specimens that is freely movable in various directions and about various axes simultaneously.

It is an object of the invention to provide a simple, inexpensive microscope translation stage.

It is an object of the invention to eliminate complicated parts subject to breakage and other damage.

It is an object to provide a translation means which can be accommodated by a plurality of microscope configurations.

Accordingly, a microscope stage operable for providing translation between a specimen receiving surface and a microscope base characterized by providing continuous and simultaneous translations along a plurality of directions and about a plurality of axes, said microscope stage being comprised of:

a) a base member;

b) a pedestal member;

c) a grease interface; and d) a slide plate member, said base member fixably attached to said pedestal member, said pedestal member being in proximity to said slide plate member with said grease interface therebetween, is provided.

A better understanding can be had with reference to the detailed description of Preferred Embodiments and with reference to the appended drawing figures. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternate versions may be possible.

BRIEF DESCRIPTION OF THE DRAWINGS

These and other features, aspects, and advantages of the present invention will become better understood with regard to the following description, appended claims and drawings where:

FIG. 3A is shows the cross section of FIG. 2 and 3B shows a perspective of a particular piece in that drawing;

PREFERRED EMBODIMENTS OF THE INVENTION

Figure 1:
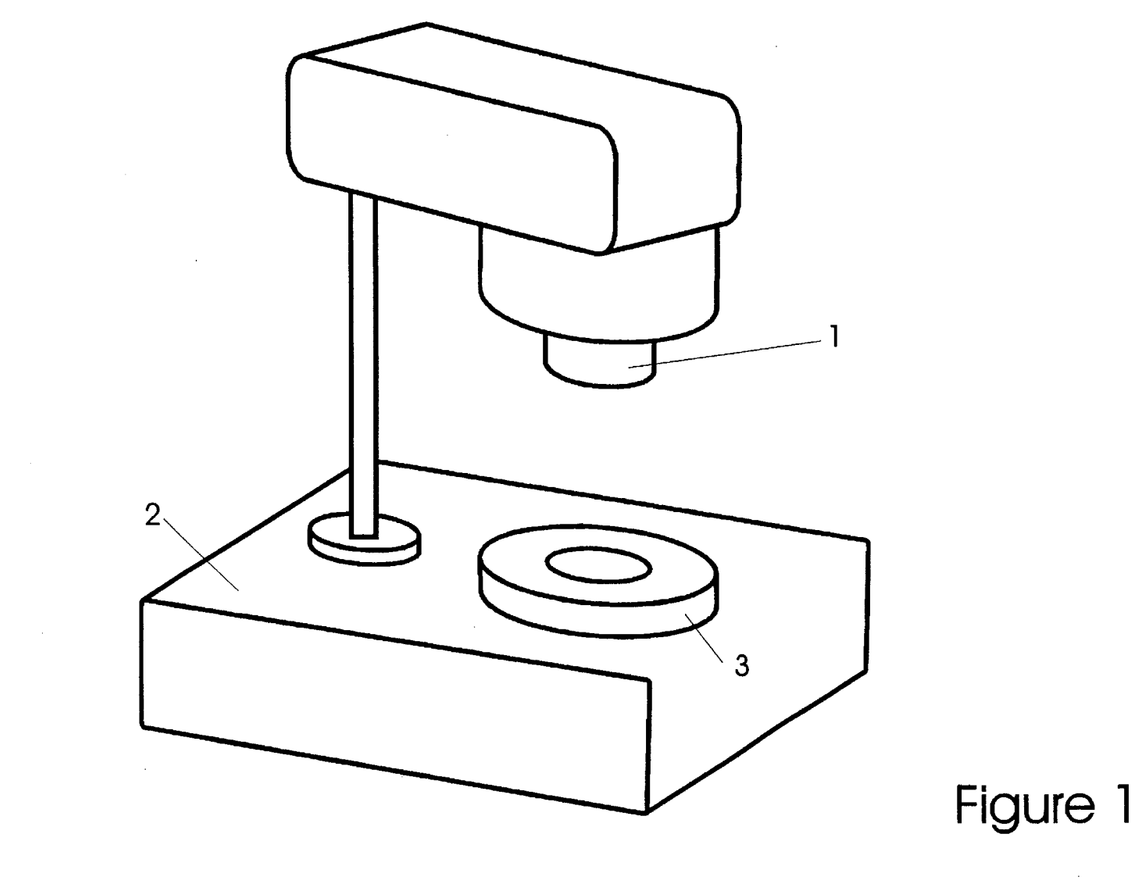
FIG. 1 is a perspective of a simple microscope arrangement.
Figure 2:
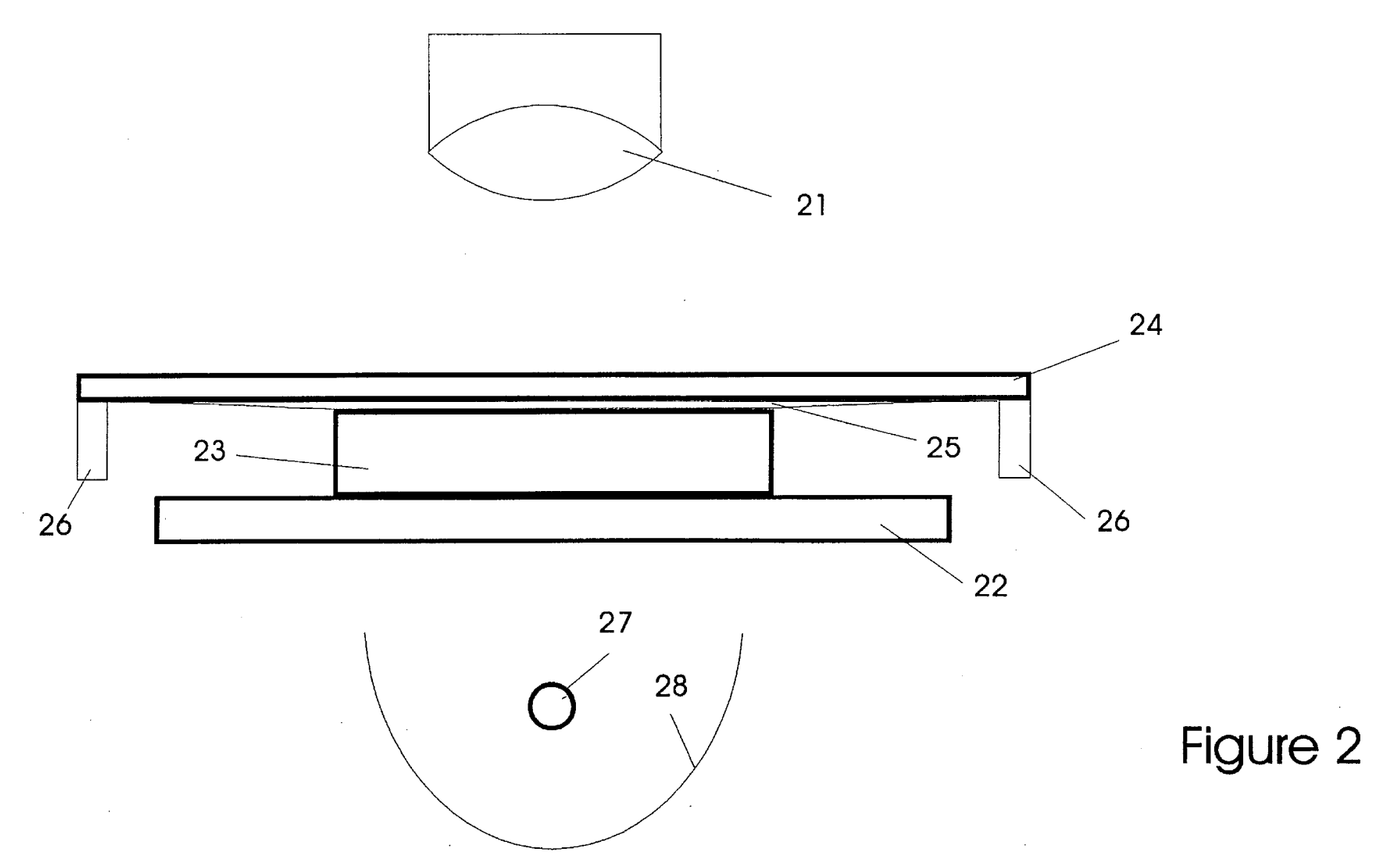
FIG. 2 is a cross section view of a microscope stage, lens and illumination source arrangement.

With reference to the drawing FIGS. 1–7, one might appreciate a better understanding of preferred versions of the invention. In particular, FIG. 1 illustrates a simple, microscope arrangement having a lens 1 mounted above a base 2 containing a light source therein and a movable stage 3 positioned below the lens to accommodate objects to be examined. The cross section drawing of FIG. 2 shows the stage in detail as it may be positioned between the lens 21 and a light source having a light bulb 27 and reflector 28. The stage may be comprised of the following elements: a base plate 22, a pedestal 23, a grease layer 25, a slide plate 24, and keeper ring 26.

Figure 2A:
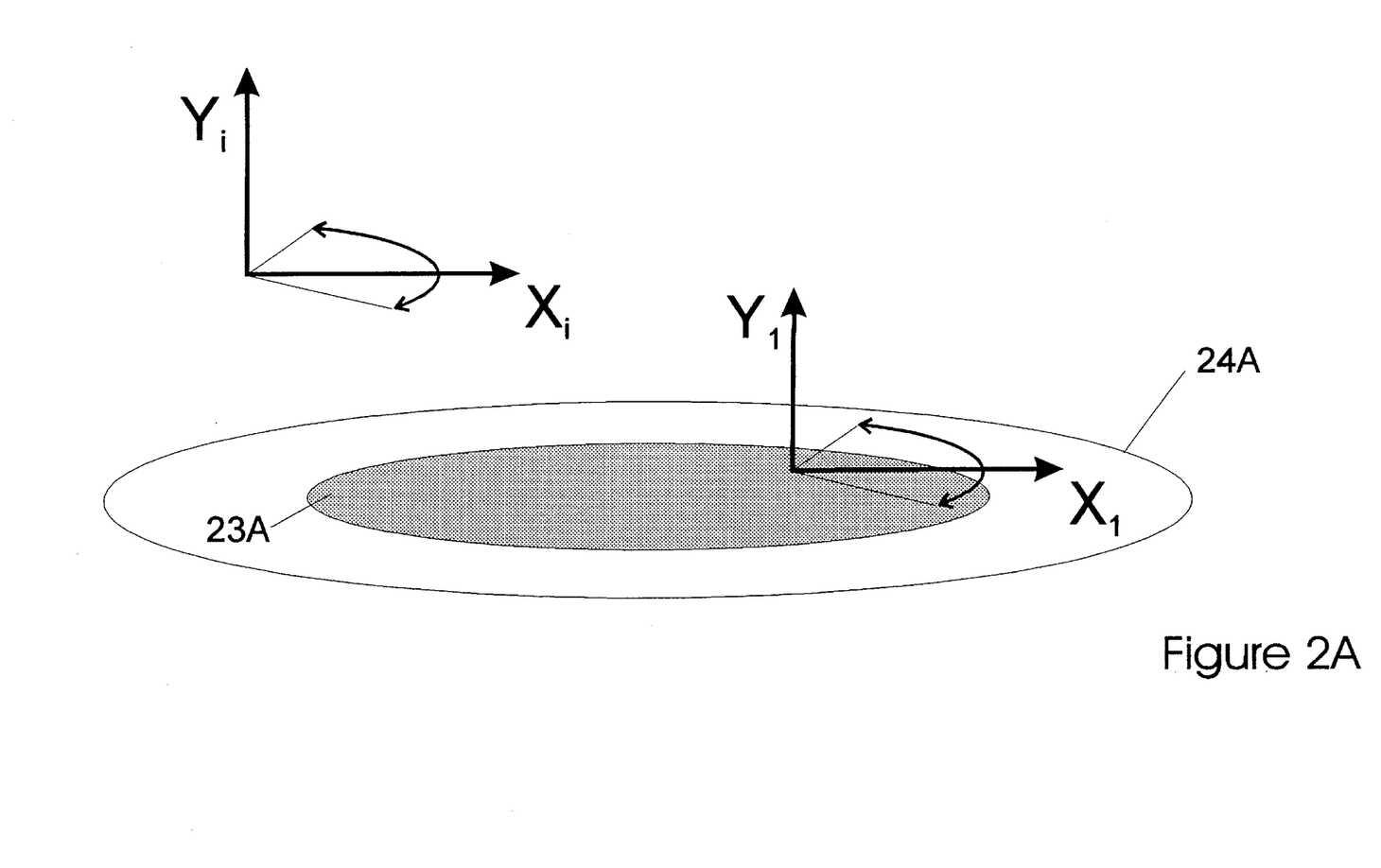
FIG. 2A is a top view perspective of surfaces of objects in FIG. 2.

FIG. 2A shows a perspective view of the bottom surface of a slide plate 24A and the top surface of a pedestal 23A. An arbitrary coordinate system is shown as $X_i$, $Y_i$. For every point on the top surface of a pedestal there exists a coordinate reference system. For example $X_1$, $Y_2$. The slide plate is movable in both a linear and rotational fashion with respect to the coordinates, or in combinations thereof. Similarly for every point in the plane which contains the surfaces there exists a coordinate system which defines possible displacements and rotations.

With the exception of the keeper ring, the elements can be generally transparent allowing light from the light source to pass therethrough and illuminating an object which may be placed onto the top surface of the slide plate.

Figures 3A, 3B:
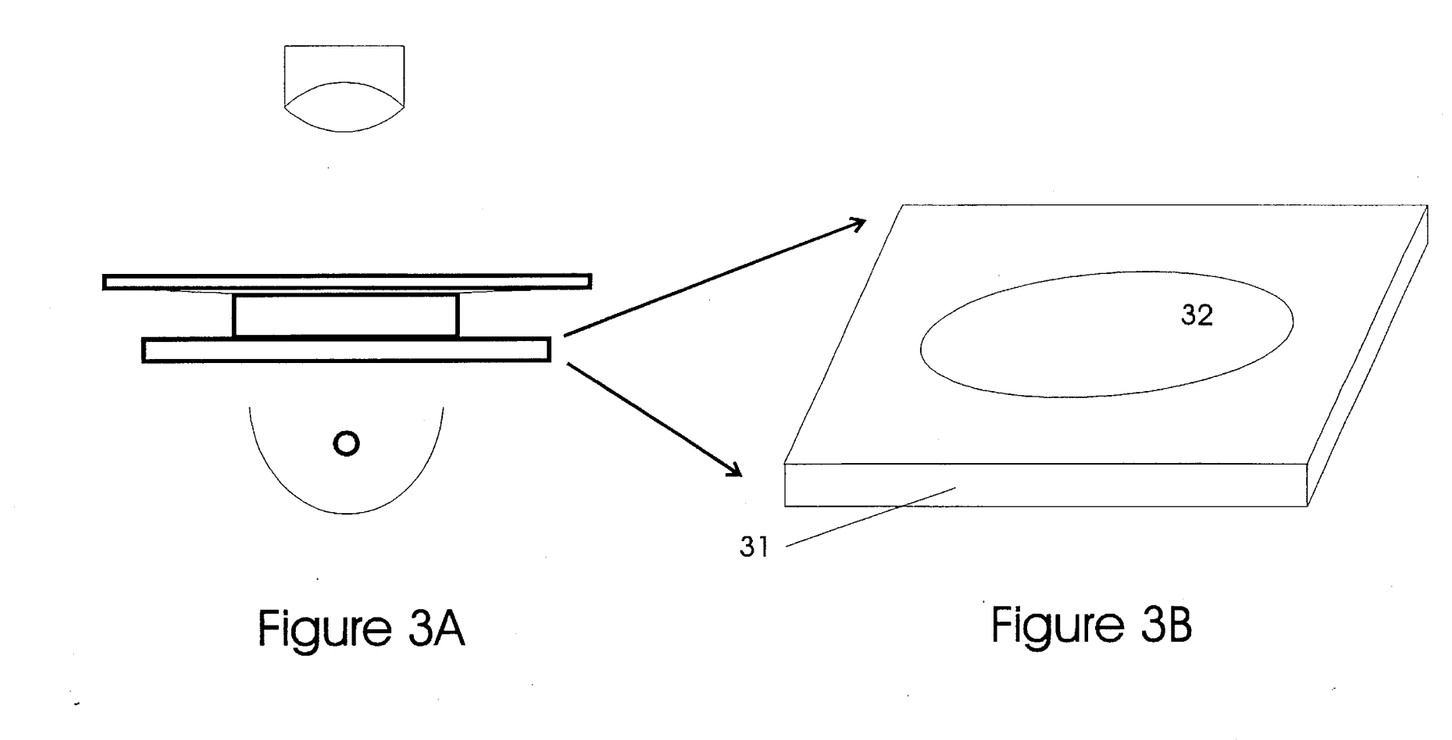

The base plate 22 can be a glass plate which couples the stage to a microscope base. The perimeter may be configured into various shapes and sizes to interface with various standard microscope bases. For example, the base plate may have a square perimeter. In addition, the base plate may be constructed of a rigid material other than glass. If the chosen material is an opaque material, then an aperture must be provided therein to allow light transmission along an optical path from the light source to the top surface of the slide plate. FIG. 3A and 3B show a possible configuration of a base plate having a square periphery 31 and circular aperture 32.

A pedestal 23 may be a solid transparent material in the form of a disk having two surfaces parallel to each other. The pedestal can be solidly fixed to the base plate via epoxy, screws, welds or other mechanical means. The pedestal generally has sufficient thickness to provide some clearance between the top surface thereof and the based plate. The top surface of the pedestal should be a smooth surface which can accommodate the application of grease 25 thereon.

The grease may be an optical quality which allows light to be transmitted from inside the pedestal to inside the slide plate. The grease couples the top surface of the pedestal to the bottom surface of the slide plate.

The grease may completely cover the surface of the pedestal in a uniform thin layer and may also extend over the bottom surface of the slide plate forming a meniscus type boundary between the pedestal and the slide plate.

The slide plate can also be a transparent rigid material in a disk form having two parallel surfaces. Glass or plastic may be preferred as they are inexpensive and easy to fabricate. The diameter of the slide plate is appreciably larger than the diameter of the pedestal is typically between 1.5–4 times larger. It will be shown that this provides the limits for the range of motion. The bottom surface is flat and is operable for accommodating the application of grease thereon. The top surface is also generally flat and may incorporate certain means for holding specimen objects thereon. The surface may also be prepared in a way to achieve some optical finish. For example, a "ground glass" finish could be used to diffuse light incident on that surface providing a more uniform illumination field.

At the periphery of the slide plate may be an annular keeper ring 26 held fixed and extending downwardly therefrom. This ring may be metallic and glued to the slide plate.

Figure 4:
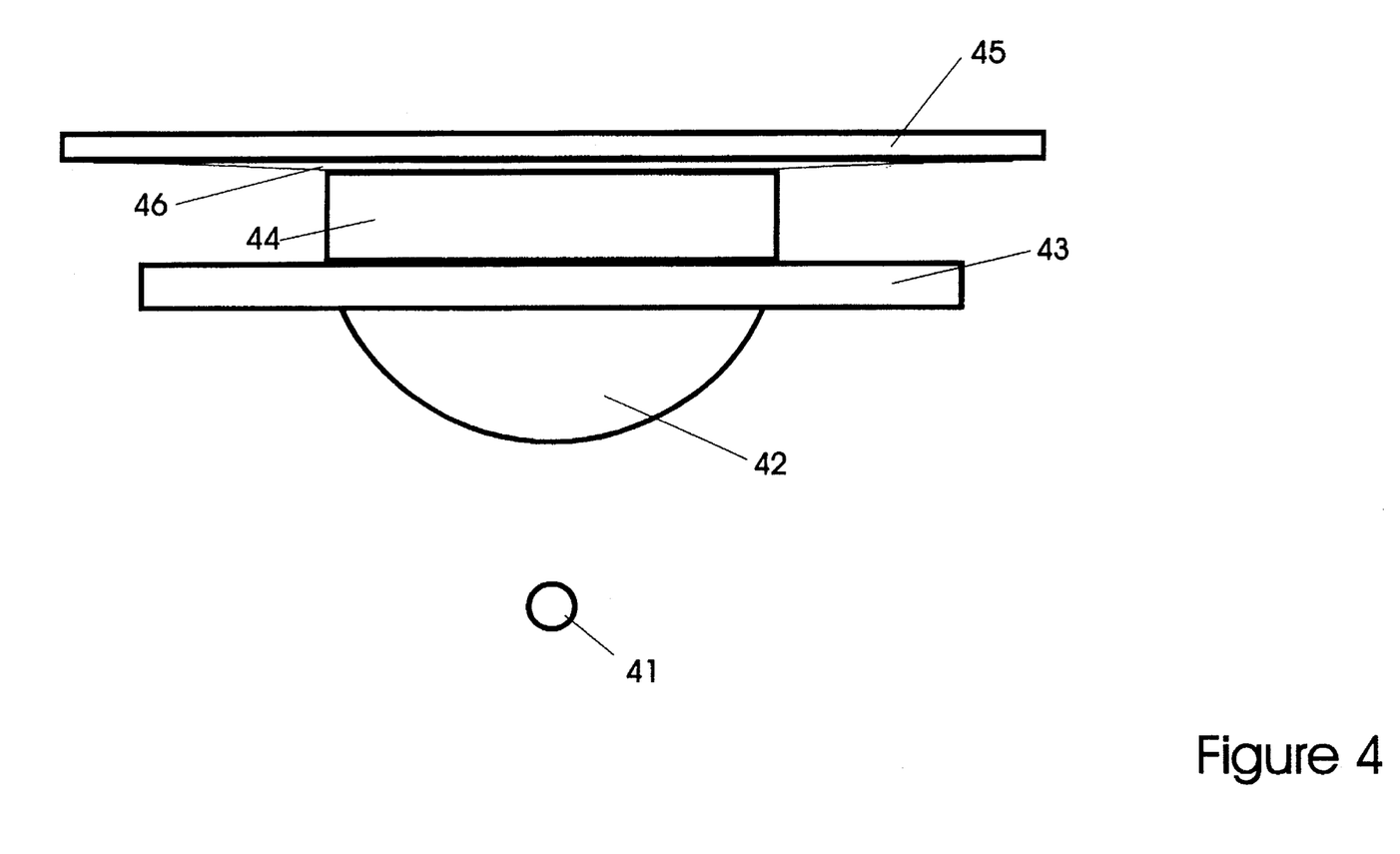
FIG. 4 shows a cross sectional view of an alternative arrangement.

Some alternatives can be incorporated into the configurations described without deviation from the essence of the invention. In FIG. 4, the bottom surface of the base plate 43 may have a condenser type lens 42 formed thereon which may tend to better couple light from the source 41 to the device. The same grease 46 and slide plate 45 would then together form a stage with similar motion properties.

Figure 5:
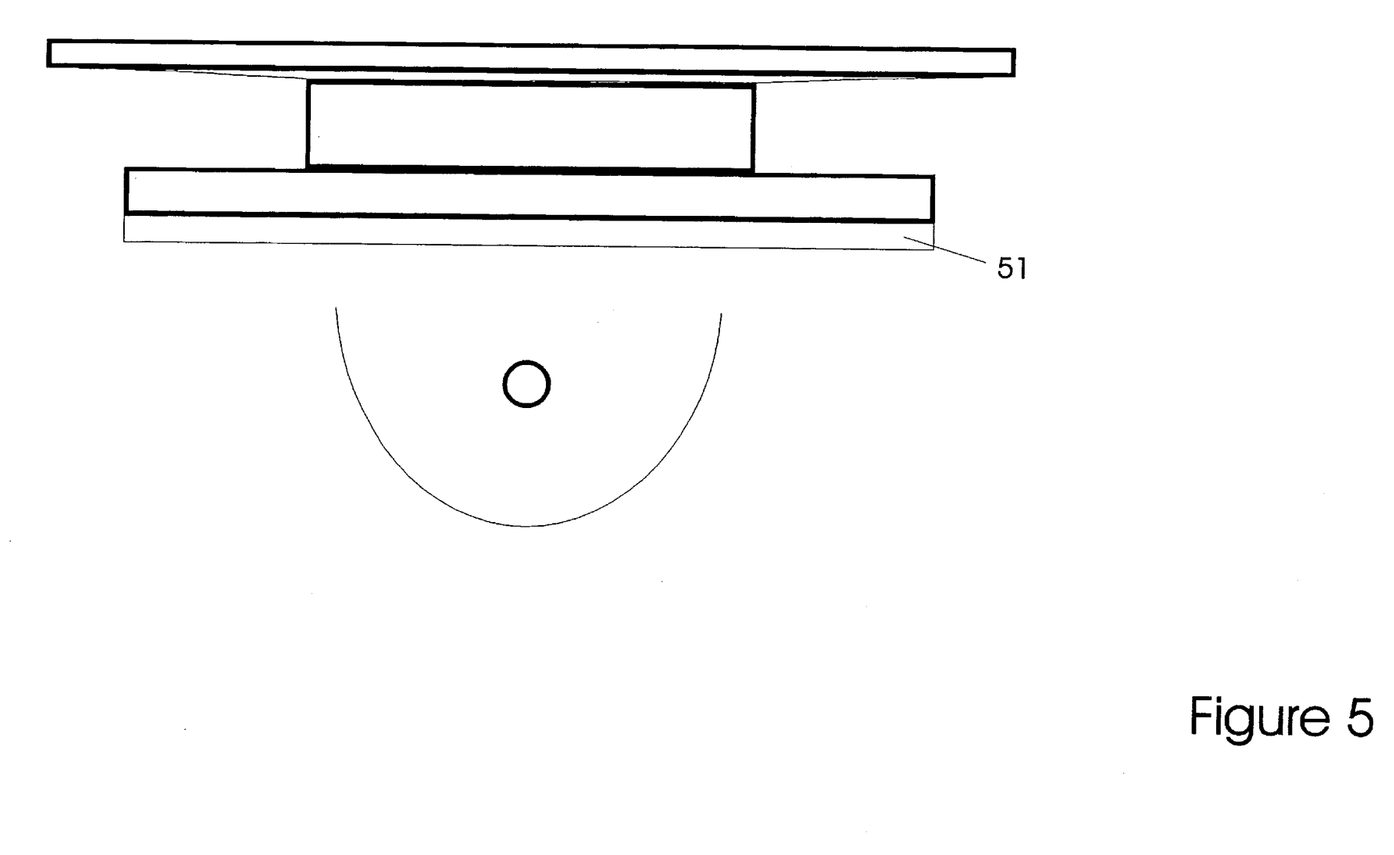
FIG. 5 shows a cross sectional view of an alternative arrangement.

Alternatively, optical elements such as a polaroid 51 in FIG. 5 may be formed onto a surface of the base plate or pedestal to provide the advantages associated with polarized illumination.

Figure 6:
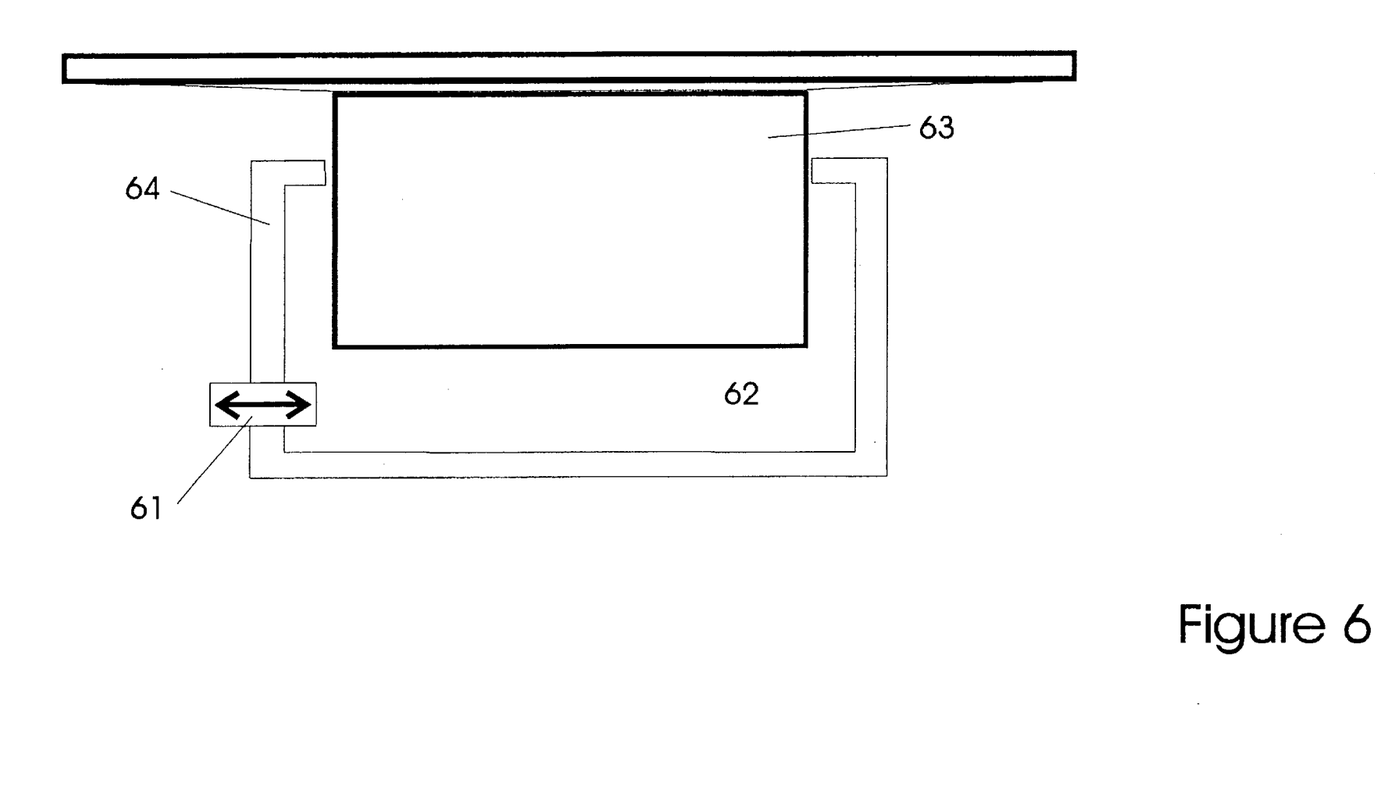
FIG. 6 shows a preferred version having advanced features.

In another advanced version of FIG. 6, The base plate 64, may be a complex arrangement which couples the pedestal to the microscope base where a provision for adjustment along a direction perpendicular to the surface of the slide plate is made. The base plate forms a volume 62 which may receive a liquid via duct 61 to provide a hydraulic type adjustment of the stage. This direction is sometimes referred to as a z-axis adjustment. Such adjustment may facilitate a dynamic focusing scheme.

Figure 7:
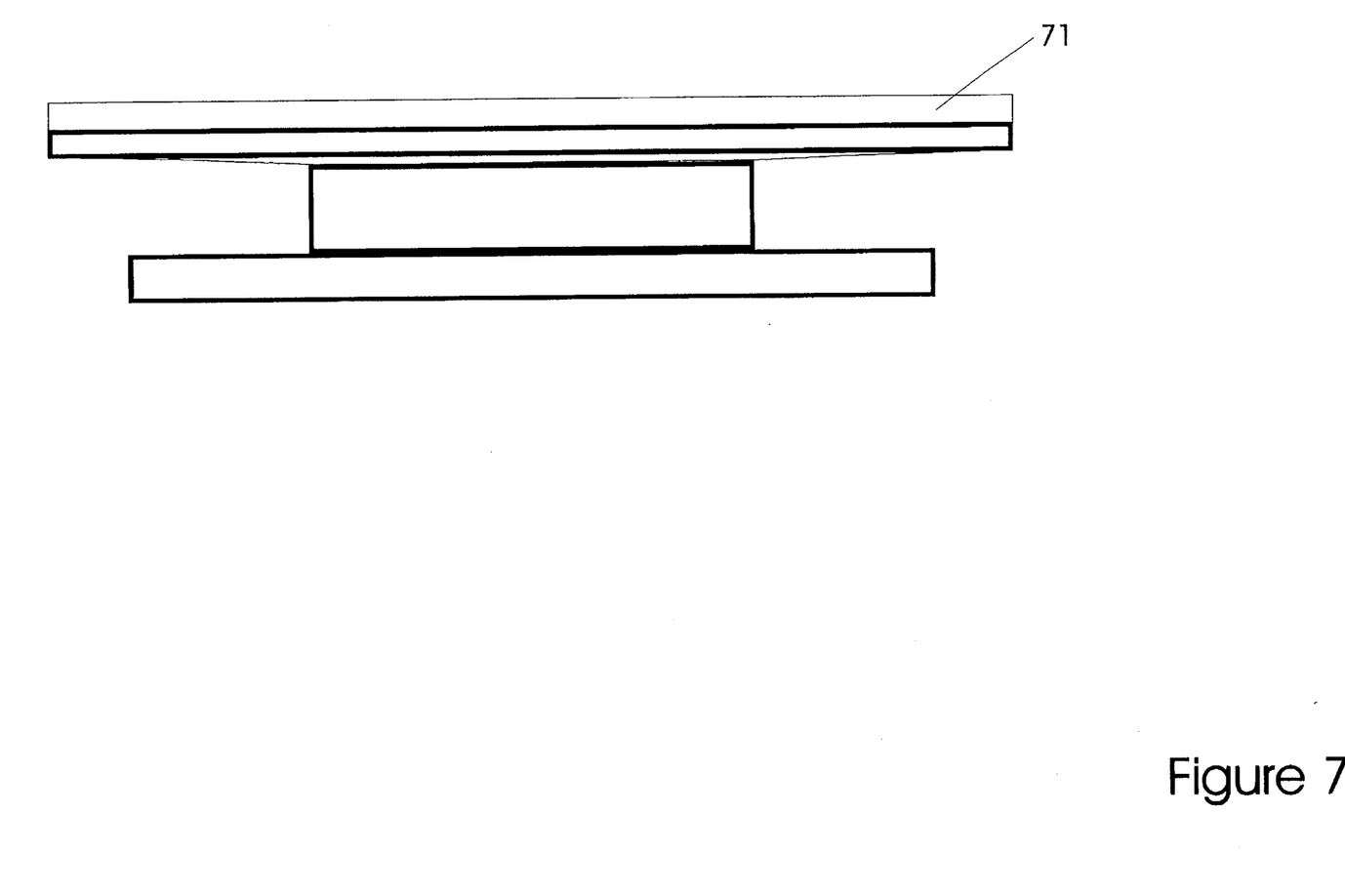
FIG. 7 shows yet another cross sectional view of an alternative arrangement.

Finally, FIG. 7 shows that optical elements such as polaroid 71 may also be combined with the movable slide plate. This version is different than the version where the polaroid was attached to the pedestal. When the polaroid is attached to the pedestal, its polarization direction does not change and remains fixed in relation to the microscope base regardless of the position of the slide plate. However, if a stage is formed with the polaroid located in shown, then the polarization angle is dynamic with rotations of the slide plate.

With configuration parameters set forth above, the function of the stage can be presented as follows:

As subject specimens of microscopic study often involve regions large in comparison to the field-of-view of microscopic lenses and may involve movement about those fields, it may be necessary to translate a subject carrier about a plane which is orthogonal to the optic axis. Microscopes of the art typically have a rack and pinion device which provides movement along two independent directions sometimes referred to as X and Y directions. An X–Y stage will allow, via combinations of X and Y movements, pans of the field to be displaced so that they lie on the optic axis. In addition, some advanced devices may provide for a rotational or "theta" θ direction adjustment. However a complex displacement path such as a spiral is not easily achieved.

Simultaneous, precise applications of X, Y and θ adjustments would be required to provide a spiral path displacement. If the subject of study is a particularly active paramecium moving along a spiral path (or other complex path) one would find it quite difficult to follow the creature with standard stages having X, Y, and even θ movement axes.

Now, with a stage having a grease interface as described and disposed between a light source and a lens as shown, an object can be followed easily regardless of its path.

Forces applied to the slide plate in any direction will cause it to move with respect to the pedestal and hence the optic axis of the microscope. In addition, rotational movements are similarly possible. Forces applied about a rotational axis will cause the slide plate to rotate. Any combination of X, Y, and theta displacements are possible and may be realized by simply pushing with the finger tips. In this way, the slide plate can move simultaneously along a plurality of directions and about a plurality of axes.

Edges of the slide plate are easily accessible by a user's fingertips and the forces described are realized by application of pressure from one's fingers. Displacement forces in stages of the art are typically linear and are achieved via gear and thread means. The disadvantage is clear, restrictive to particular directions renders the device cumbersome for certain movements. However, the forces applied via a user's fingertips are very dynamic in the sense that simultaneous application of force in complex combinations of linear and rotation are easily possible.

Although the present invention has been described in considerable detail with clear and concise language and with reference to certain preferred versions thereof including the best mode anticipated by the inventor, other versions are possible. Therefore, the spirit and scope of the appended claims should not be limited by the description of the preferred versions contained therein.

We claim:

1. A microscope stage operable for providing translation between a specimen receiving surface and a microscope base characterized by providing continuous and simultaneous translations along a plurality of directions and about a plurality of axes, said microscope stage being comprised of:
   a) a base member;
   b) a pedestal member;
   c) a grease interface; and
   d) a slide plate member,
said base member fixably attached to said pedestal member, said pedestal member being in proximity to said slide plate member with said grease interface therebetween.

2. The microscope stage of claim 1,
   said base plate member being a rigid planar member of arbitrary periphery operable for coupling the stage to a microscope base, further operable for receiving thereon and having fixed thereto;
   said pedestal member being a rigid planar member of disk shape having two parallel surfaces and a circular periphery, a first parallel surface being fixably attached to said base plate member, a second parallel surface being receptive of;
   said grease interface being a thin layer of viscous grease operable for coupling the second surface of said pedestal member to a surface of;
   said slide plate member being a rigid planar member of disk shape having a diameter larger than the diameter of said pedestal member having two parallel surfaces, a first surface being receptive of said grease interface and a second surface being receptive of a specimen to be examined.

3. The microscope stage of claim 2,
   said slide plate member having a polaroid thereon.

4. The microscope stage of claim 2,
   said slide plate member having a keeper ring fixed thereto at the periphery thereof, the keeper ring extending away from the first surface having an inside diameter substantially larger than the diameter of said pedestal member whereby the keeper ring will retain the slide plate member onto the pedestal and prevent a displacement where an edge of said slide plate member passes an edge of said pedestal member.

5. The microscope stage of claim 1,
   said base plate member and said pedestal member being an integral piece having a circular flat surface fixably mounted to a microscope base, the diameter of the circular flat surface being of the order in size as is a field-of-view of a microscope lens at the plane of the surface;
   said grease interface being an optically transparent thin layer of grease operable for facilitating translation between the circular flat surface of said pedestal member; and
   said slide plate member being in proximity to and coupled with the circular flat surface of said pedestal via said grease interface, operable for receiving a specimen thereon.

6. The microscope stage of claim 5,
   said integral piece having a circular flat surface and a curved surface, the curved surface being convex surface operable as a condenser lens with respect to a light source.

7. The microscope stage of claim 5,
   said integral piece having a circular flat surface and a second flat surface operable as a polaroid.

8. The microscope stage of claim 1,
   said base plate member forming a hydraulic cavity being slideably coupled to said pedestal member.

* * * * *